United States Patent
Bright

(10) Patent No.: US 9,988,320 B2
(45) Date of Patent: Jun. 5, 2018

(54) AEROBIC HOSE WRAP COMPOSTING APPARATUS AND METHOD FOR DECOMPOSING WASTE MATERIAL

(71) Applicant: Gary L. Bright, Harrison Township, MI (US)

(72) Inventor: Gary L. Bright, Harrison Township, MI (US)

(*) Notice: Subject to any disclaimer, the term of this patent is extended or adjusted under 35 U.S.C. 154(b) by 0 days. days.

(21) Appl. No.: 15/272,215

(22) Filed: Sep. 21, 2016

(65) Prior Publication Data

US 2017/0081252 A1    Mar. 23, 2017

Related U.S. Application Data

(60) Provisional application No. 62/221,300, filed on Sep. 21, 2015.

(51) Int. Cl.
C05F 17/02    (2006.01)
C05F 17/00    (2006.01)

(52) U.S. Cl.
CPC ............ *C05F 17/027* (2013.01); *C05F 17/00* (2013.01); *C05F 17/0258* (2013.01); *C05F 17/0264* (2013.01); *Y02P 20/133* (2015.11); *Y02P 20/145* (2015.11); *Y02W 30/43* (2015.05)

(58) Field of Classification Search
CPC .... C05F 17/027; C05F 17/00; C05F 17/0258; C05F 17/0264
USPC ........................................... 435/290.1–290.4
See application file for complete search history.

(56) References Cited

U.S. PATENT DOCUMENTS

| | | | | |
|---|---|---|---|---|
| 3,565,255 A | * | 2/1971 | Nordgard | C05F 17/02 210/220 |
| 4,230,676 A | * | 10/1980 | Taylor | C05F 17/0072 248/422 |
| 4,358,250 A | * | 11/1982 | Payne | F04B 9/1273 417/302 |
| 4,384,878 A | | 5/1983 | Nordlund et al. | |
| 5,766,876 A | * | 6/1998 | Santiago | C05F 17/0205 435/290.1 |
| 6,171,852 B1 | | 1/2001 | Bright | |
| 6,889,484 B1 | * | 5/2005 | Garvin | A01F 25/14 53/434 |
| 7,824,903 B2 | | 11/2010 | O'Neill et al. | |
| 2006/0188980 A1 | * | 8/2006 | Holtzapple | B09B 1/00 435/290.1 |
| 2006/0246579 A1 | * | 11/2006 | Thurot | C05F 17/02 435/290.4 |
| 2008/0199943 A1 | * | 8/2008 | Widmer | B03B 9/06 435/262 |

FOREIGN PATENT DOCUMENTS

DE    19653116 C2    8/1998
WO    2007006070 A1    1/2007

* cited by examiner

*Primary Examiner* — Michael L Hobbs
(74) *Attorney, Agent, or Firm* — Young Basile Hanlon & MacFarlane, P.C.

(57) ABSTRACT

Decomposing waste material may use a no-turn, aerobic composting apparatus that includes an enclosure for containing waste material and a fluid distribution system including a fluid injection member removably disposable in waste material disposed in the enclosure. The fluid injection member includes a plurality of spaced apertures for injecting fluid into the waste material.

16 Claims, 15 Drawing Sheets

AEROBIC HOSE WRAP COMPOSTING APPARATUS AND METHOD FOR DECOMPOSING WASTE MATERIAL

CROSS-REFERENCE TO RELATED APPLICATION(S)

This application claims priority to U.S. Provisional Patent Application Ser. No. 62/221,300, filed Sep. 21, 2015, which is incorporated by reference in its entirety.

TECHNICAL FIELD

The disclosure relates to decomposing waste material into compost.

BACKGROUND

The process of decomposition is a gradual complex process that changes organic waste material into compost. This process can be used for sanitary recycling and reclamation of organic waste material. Aerobic composting is a process of decomposition and stabilization that uses oxygen. In aerobic decomposition, living organisms that use oxygen feed upon the organic waste material and decompose waste material more efficiently. The decomposition process slows as the living organisms deplete the oxygen. Thus, periodically or continuously aerating a compost pile of waste material will increase the speed of the decomposition process.

SUMMARY

Aerating a compost pile of waste material may be performed using different techniques. Compost to automatically or manually turn compost to increase the oxygen present is generally expensive or requires manual labor to operate. Forcing air into or through the compost pile using fans decreases the temperature of the compost pile in an attempt to reach an optimal temperature range of the living organisms that break down the waste material. If the temperature of the compost pile does not reach that optimal temperature range, rotting can occur. Still another technique is to aerate a compost pile by poking holes into it and putting perforated pipes into the holes. If too much oxygen is present, the compost pile can dry out and impede the decomposition process.

Disclosed herein are implementations of a composting apparatus and method for decomposing waste material using an aerobic hose wrap. The composting described herein does not require turning and is relatively inexpensive.

One implementation of an aerobic composting apparatus for composting waste material includes an enclosure for containing waste material and a fluid distribution system including a fluid injection member removably disposable in waste material disposed in the enclosure. The fluid injection member includes a plurality of spaced apertures for injecting fluid into the waste material.

In some implementations of the apparatus, the waste material is arranged in a vertical and horizontal extending mass, and the spaced apertures of the fluid injection member inject pressurized fluid from a source of pressurized fluid into the waste material. The fluid injection member is disposed within the mass of waste material in a plurality of spiral loops, adjacent portions of the spiral loops being laterally spaced apart.

A method of composting waste material described herein includes positioning waste material in an enclosure formed of longitudinally extending spaced walls and introducing a fluid injection member between ends of the spaced walls of the enclosure within the waste material. In this way, the fluid injection member is disposed of top of a first layer of waste material and covered by a second layer of waste material in the enclosure.

In some implementations of the method, the waste material is deposited in a vertical and horizontally extending mass. A fluid distribution system that includes the fluid injection member is introduced into the mass of waste material such that the fluid injection member is disposed above a first layer of waste material within the mass of waste material and is covered by a second layer of waste material in the mass of waste material. The fluid injection member may also be disposed in a plurality of longitudinally extending spiral loops within the mass of waste material, wherein the facing adjacent portions of the plurality of spiral loop are laterally spaced from each other.

The fluid injection member may be arranged substantially within a horizontal plane in a serpentine pattern.

These and other aspects of the present disclosure are disclosed in the following detailed description of the embodiments, the appended claims and the accompanying figures.

BRIEF DESCRIPTION OF THE DRAWINGS

The disclosure is best understood from the following detailed description when read in conjunction with the accompanying drawings. Unless otherwise noted, the various features of the drawings are not to-scale.

DETAILED DESCRIPTION

Figure 1:
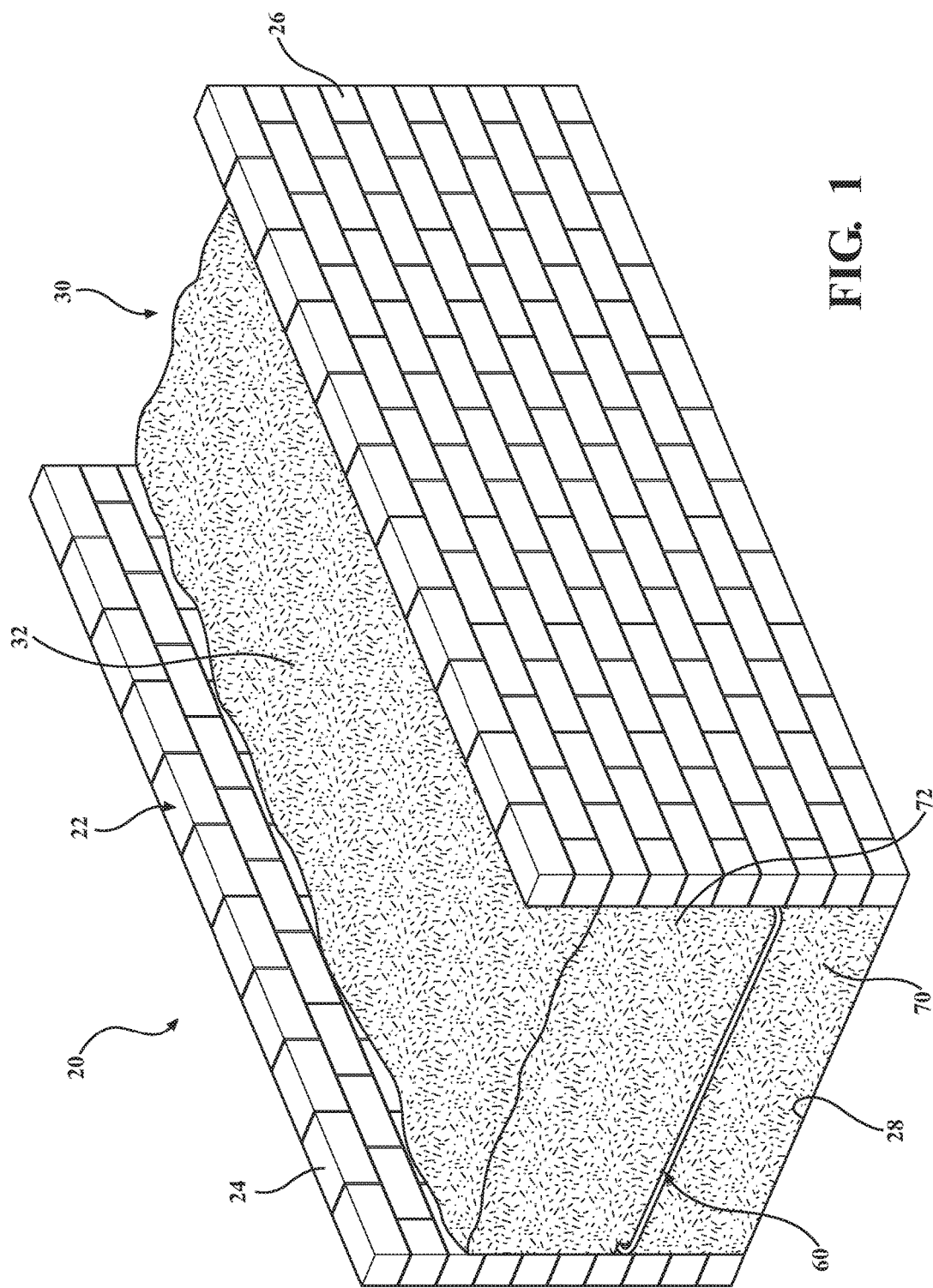
FIG. 1 is a perspective view of a first implementation of an apparatus for decomposing waste material.

Referring to FIGS. 1-16 of the drawing, there are illustrated various aspects of an apparatus and method for decomposing waste material. The waste material can be, for example, organic waste material, such as food, paper, cardboard, wastewater sludge, yard waste, manure, wood chips, etc.

The waste material can be, in some cases, shredded or ground to a small particulate size, such as an average ¼ inch particle size. This particulate size allows the temperature of the volume of waste material to quickly reach a trigger point for the start of microorganism activity and increases the rate of micro-organism activity. In the case of semi-liquid waste material, such as waste water sludge, a bulking agent, such as saw dust or wood chips, can be added to the waste material.

An aerobic composting apparatus 20 includes an enclosure 22 that is open to the ambient environment. The enclosure 22, for example, includes first and second generally parallel vertical walls 24 and 26. The parallel vertical walls 24 and 26 are made from any suitable material, such as cinderblocks, bricks, metal sheets, etc. Further, the parallel vertical walls 24 and 26 may have any height and any length. In one example, the parallel vertical walls 24 and 26 have a height of about five feet and length of about fifty feet; although it will be understood that other heights either greater or less than five feet and lengths greater or less than fifty feet may also be employed.

The parallel vertical walls 24 and 26 are firmly secured on a hard surface 28. The surface 28 may be concrete, although hard packed soil, metal, asphalt or other fluid impervious surfaces may also be used. The surface 28 may optionally be lined with a fluid impervious barrier, such as high-density polyethylene sheeting.

An alternate fluid barrier may also be employed to absorb any liquids or fluids that may leach out of the waste material. For example, a barrier formed of six inches of small particle size sawdust may be disposed on top of the surface 28. An optional second layer of slightly larger particle size, but still small-size, woodchips can then be disposed on top of the first layer to complete the barrier. Each layer of the barrier may be approximately six inches in height.

The spaced, generally parallel vertical walls 24 and 26 and the surface 28 form a trough or bay 30 that receives, e.g., particulate, waste material 32, which can be dumped or otherwise disposed in the bay 30 approaching or slightly exceeding the upper edge of the parallel vertical walls 24 and 26. A conveyor, either over head of the enclosure 22 or on the surface 28 of the enclosure 22, may be employed for depositing and removing the waste material 32 into and out of the enclosure 22.

Figure 2:
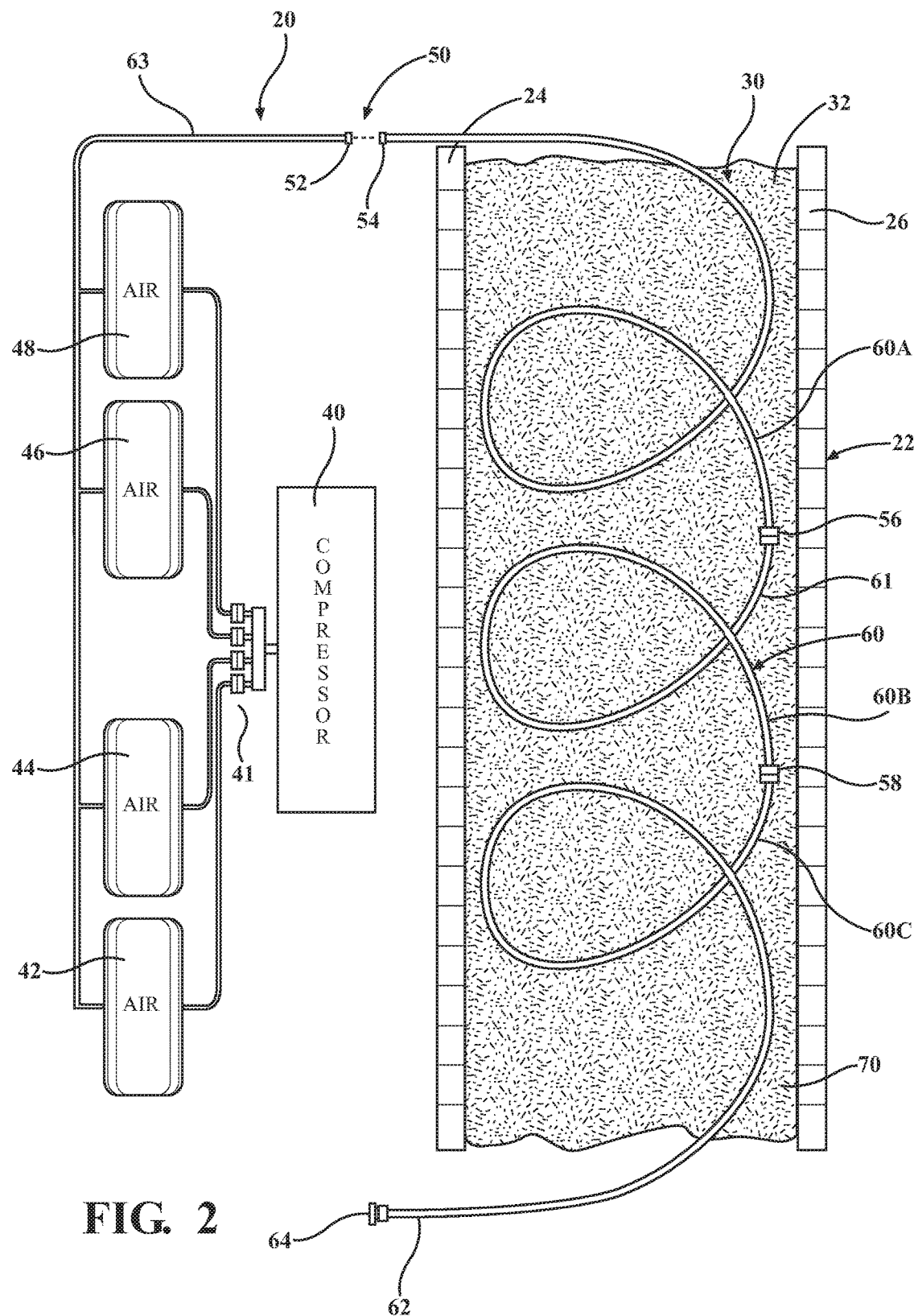
FIG. 2 is a partial, schematic top view of the first implementation of FIG. 1 including a compressor.

The aerobic composting apparatus 20 includes a fluid injection system, such as an oxygen delivery system, which includes a compressor 40 (see FIG. 2). The compressor 40 can be exteriorly mounted adjacent one of the parallel vertical walls 24 or 26. The compressor 40 may be a three phase electric powered compressor or a compressor driven by gas, such as propane gas. Appropriate controls including a programmable timer, pressure gauge, etc., may be employed with the compressor 40 to establish a maximum pressure in one or more fluid reservoirs, such as air tanks 42, 44, 46, and 48. The controls may concurrently or alternatively use the timer to control the on/off operation of the compressor 40.

The compressor 40 supplies pressurized fluid to the fluid reservoirs or air tanks 42, 44, 46, and 48 through a tee or manifold 41. The number and size of the air tanks 42, 44, 46, and 48 may vary depending upon the amount fluid used in the aerobic composting apparatus 20, the quantity of waste material, and the length of time needed to aerobically decompose a given quantity of waste materials as well as economic factors in selecting the number, size, and interconnections of the air tanks 42, 44, 46, and 48.

The outlets of the air tanks 42, 44, 46, and 48 are coupled together and connected or teed to one connector 52 of a two-part connector 50. The other connector part 54 of the two-part connector 50 is attached to one end of flexible fluid carrying conduit, hereafter referred to as a fluid distribution member or a first hose 60, removable mountable in the bay 30 within the waste material 32 as described hereafter. Any type of two-part connector 50 may be employed, such as a threaded connector, a quick disconnect connector, etc.

The first hose 60, which may be for example a rubber or polymeric hose, has a plurality of spaced, small diameter apertures 61, such as 3/64-inch diameter or smaller apertures, along the length of its exterior surface. Such apertures 61 may be provided at any spacing, such as one aperture 61 per one to two feet along the length of the first hose 60. Although only the first hose 60 is shown, the aerobic composting apparatus 20 may include more than one first hose.

The first hose 60 can be constructed of a pliable material that expands and retracts when pressurized or depressurized with fluid. When depressurized, the first hose 60 contracts such that the apertures 61 close to prevent plugging with waste material. When the first hose 60 is pressurized, the apertures 61 in the first hose 60 expand-opening the apertures 61 to the throughbore extending through the first hose 60.

The first hose 60 may be provided in a single continuous length. However, for any installation, such as installations approaching or exceeding fifty feet in length of the parallel vertical walls 24 and 26, the first hose 60 may be provided in at least two or more segments, with three hose segments 60A, 60B, and 60C shown by example in FIG. 2.

Further, for substantially equal air flow through the apertures 61 in the first hose 60 due the pressure differential between an inlet end at the two-part connector 50 and the opposite end 62 of the first hose 60, which closed off by a plug 64, the hose segments 60A, 60B, and 60C may be provided in decreasing diameter from the inlet. For example, the main fluid or air inlet supply line 63 from the air tanks 42, 44, 46, and 48 may have a one-inch diameter. A first hose segment 60A may have a one-half inch diameter, the second hose segment 60B may have a quarter-inch diameter, and the third or last hose segment 60C may have a three-sixteenths diameter. This decreasing diameter over the length of the first hose 60 insures substantially equal pressure along the length of the first hose 60 without a significant pressure drop, thereby providing substantially even air flow from the first hose 60 along the length of the first hose 60. Alternatively, the plug 64 may be omitted, with the opposite end 62 connected to another air inlet with a connection similar to that present at the two-part connector 50. In this way, the diameter between the two air inlets may not decrease, while substantially equal pressure is maintained. Other implementations of the apparatus for decomposing waste material may be so modified from (i.e., to feed air from two inlets).

The first hose 60, shown in FIGS. 1 and 2, is disposed or laid on top of a first layer 70 of waste material 32 disposed between the parallel vertical walls 24 and 26 on top of the surface 28. The height of the first layer 70 of waste material 32 may be from six inches to one foot when the parallel vertical walls 24 and 26 have a five-foot height. The first hose 60 is then laid in a wrap pattern from one end to the opposite end of the parallel vertical walls 24 and 26 on top the first layer 70 of waste material 32. As shown in FIG. 2, the first hose 60 is disposed in a spiral wrap forming a plurality of adjacent horizontally spaced loops lying in substantially the same plane. Fluid connectors 56 and 58, which may be quick connectors, for example, are interposed and fluidically couple the hose segments 60A, 60B, and 60C along the length of the first hose 60. The spiral wrap arrangement of the first hose 60 in the bay 30 provides a substantially even flow of air through the mass of waste material 32 in the bay 30. The air discharged from the first hose 60 may be injected downward, sideward and upward within the bay 30, thereby ensuring contact of the air with the waste material 32 in the bay 30.

After the first hose 60 has been laid in the spiral wrap pattern, a second layer 72 of waste material 32 is deposited in the bay 30 on top of the first hose 60 between the ends of the parallel vertical walls 24 and 26. This completes the arrangement of the composting components for the bay 30 where the parallel vertical walls 24 and 26 have an approximate five-foot height.

In operation, the compressor 40 may be turned on for approximately five to eight minutes to pressurize in the air tanks 42, 44, 46, and 48. The compressor 40 turns off at a preset pressure, such as 115 psi. The air tanks 42, 44, 46, and 48 remain open to allow air flow from the air tanks 42, 44, 46, and 48 through the air inlet supply line 63 to the first hose 60. The air flowing through the first hose 60 is discharged through the apertures 61 and flows through the waste material 32 in the bay 30.

When the air pressure within the air tanks 42, 44, 46, and 48 drops below a predetermined minimum pressure, such as 25 psi, for example, the compressor 40 is turned back on to re-pressurize the air tanks 42, 44, 46, and 48.

This on and off operation of the compressor 40 minimizes electrical power usage while still enabling air to be supplied in a substantially constant manner to the waste material 32 in the bay 30 over a nine to twelve-day period to allow the microorganisms within the waste material 32 to convert the waste material 32 into uncured compost.

When the composting period is complete, the air supply from the air tanks 42, 44, 46, and 48 is turned off and the two-part connector 50 separated to separate the first hose 60 from the air inlet supply line 63. The first hose 60 can then be pulled from one end, horizontally or vertically upward over the parallel vertical walls 24 and 26 through the waste material 32, until the end-most fluid connector 56 or 58 is exposed. The endmost hose segment 60A or 60C of the first hose 60 is then disconnected. Alternately, the first hose 60 can be continued to be withdrawn from the waste material 32 until the next fluid connector 56 or 58 is exposed. The fluid connectors 56 and 58 may then be disconnected. At any time, while or before one or more of the hose segments 60A, 60B, and 60C are removed from the volume of waste material 32 in the bay 30, a portion of the waste material 32 starting from one end of the bay 30 may be removed from the bay 30, by any means, such as front end loader, manually by shovels, etc.

Figure 3:
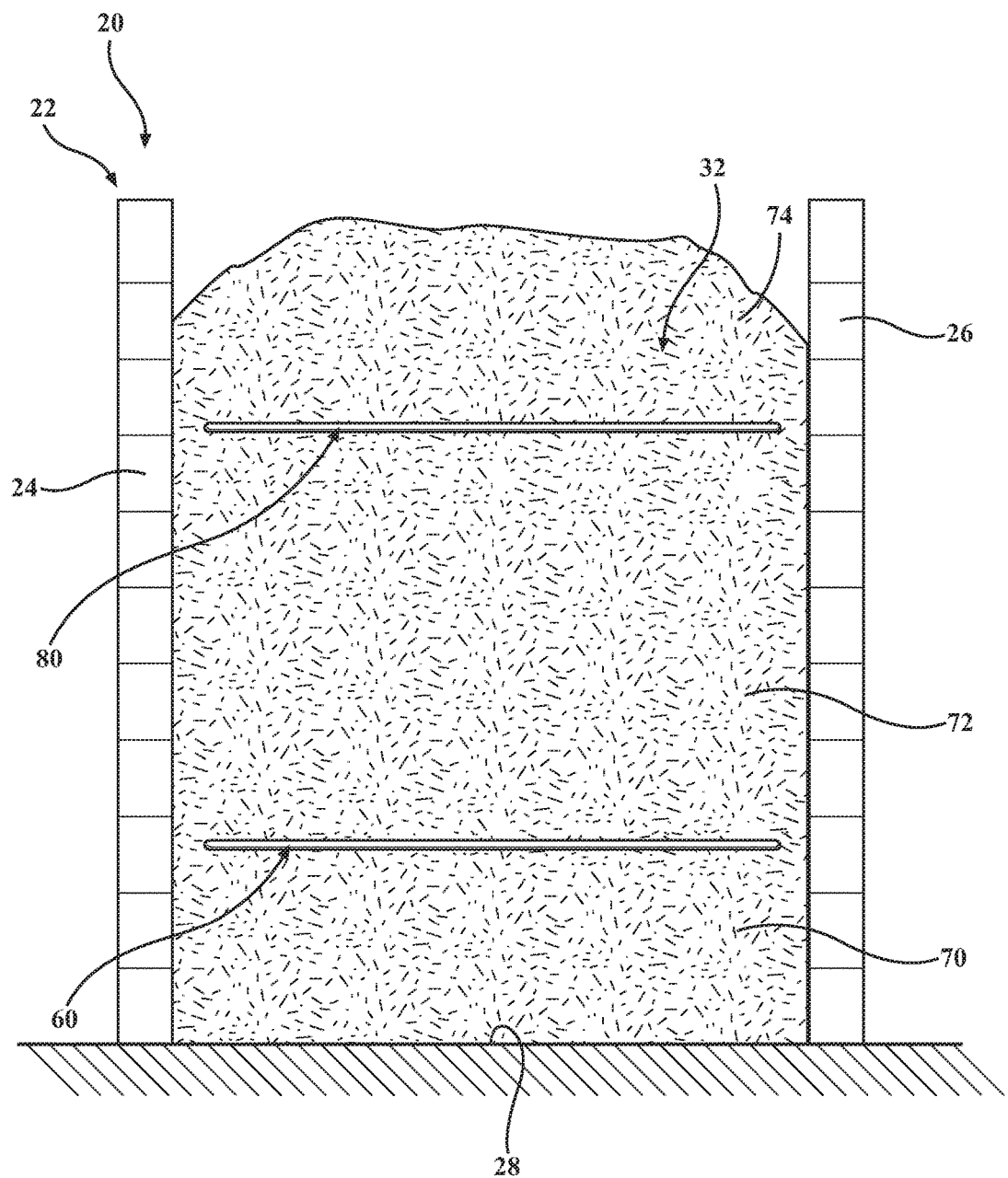
FIG. 3 is a side view of a modification of the first implementation of FIG. 1.
Figure 4:
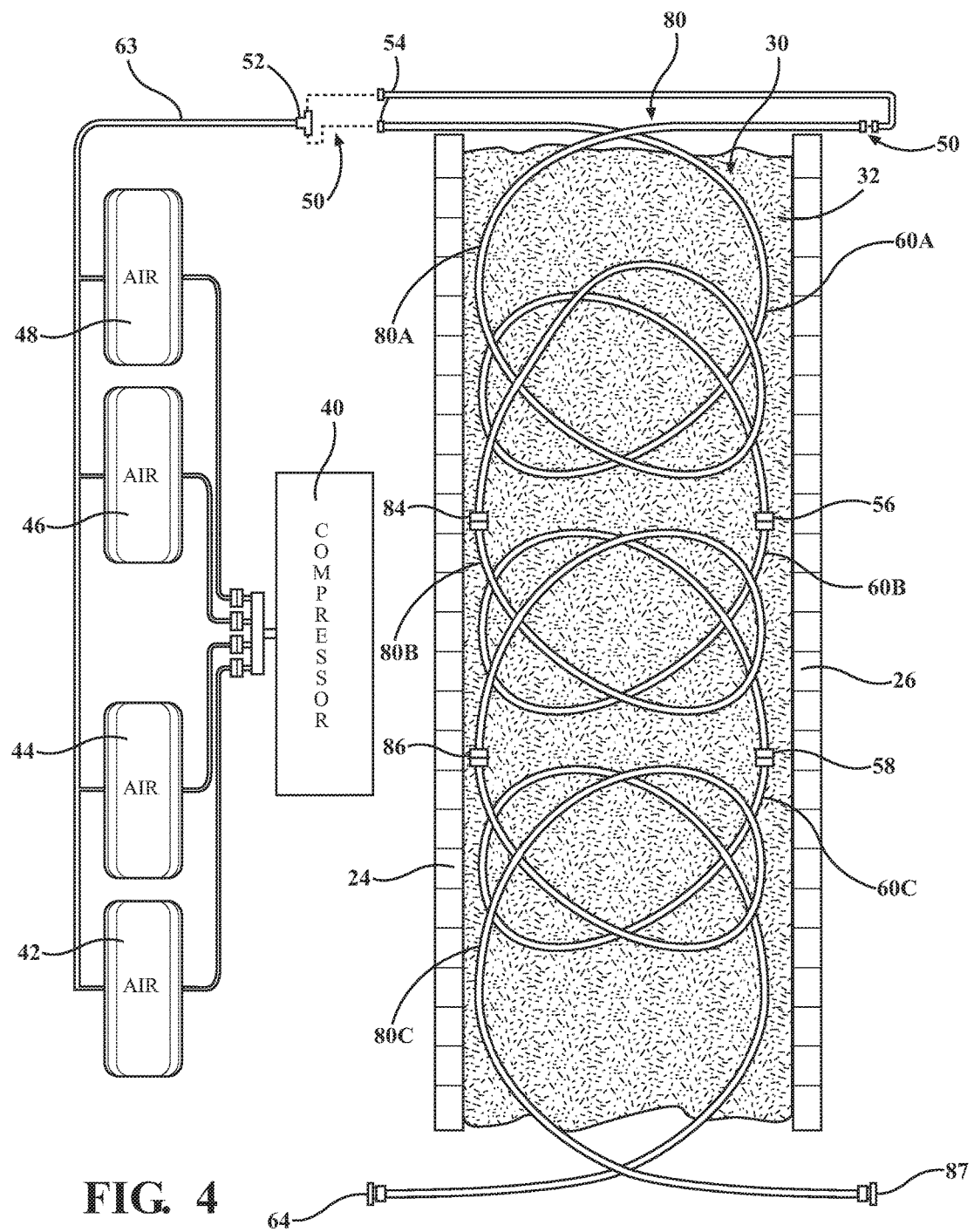
FIG. 4 is a partial, schematic top view of the modification of FIG. 3 including a compressor.

Air has difficulty migrating vertically though waste material 32. Accordingly, for composting installations with a higher height for the parallel vertical walls 24 and 26 (e.g., higher than 5 feet) or where the deposit of a height of waste material 32 is above the top surfaces of the parallel vertical walls 24 and 26, such as shown in FIG. 3, a second fluid distribution member, hereafter referred to as a second hose 80, is interposed in the enclosure 22 on top of the second layer 72 of waste material 32, which may have a two-foot depth, for example, and below a third layer 74 of waste material 32. The second hose 80 may be identical to or different from the first hose 60. In the example shown in FIGS. 3 and 4, the second hose 80 has one end connected to the two-part connector 50, which in this example has a tee connection to the connector part 54 of the first hose 60 and a second connector to the second hose 80. The second hose 80 may also be provided in decreasing diameter segments 80A, 80B, and 80C that are coupled by connectors 84 and 86 in the same manner as the first hose 60.

The second hose 80 can also be wound in a spiral wrap configuration on top of the second layer 72 of waste material 32. The second hose 80 may be wrapped in an opposite directed spiral wrap configuration from the first hose 60; although it is not necessary that the spiral loops of the first hose 60 and the second hose 80 be vertically offset or aligned. The opposite end of the second hose 80 is closed by a plug 87.

Air can be supplied to the first hose 60 and the second hose 80 generally at the same time from the air tanks 42, 44, 46, and 48.

Removal of the composted waste material from the enclosure 22 and the removal of the first and second hoses 60 and 80 are performed in the same manner as described above for the first hose 60 shown in FIG. 1.

Figure 5:
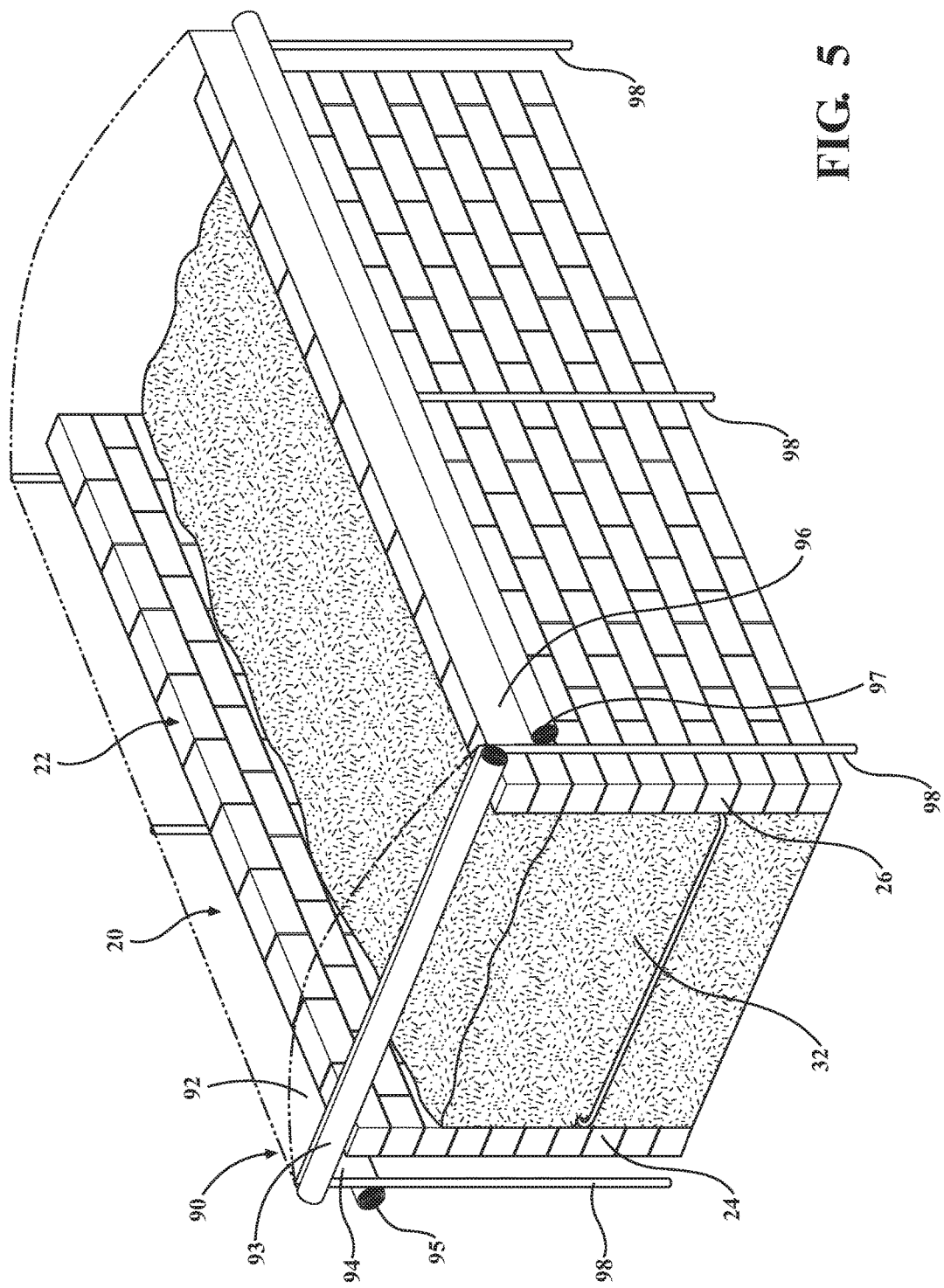
FIG. 5 is a perspective view of a modification of the first implementation of FIG. 1.

As described above, the enclosure 22 is open to the ambient environment. As shown in FIG. 5, an optional cover 90 may be provided over the top edges of the parallel vertical walls 24 and 26 to minimize the deposit of moisture from rain, snow, and the environment into the waste material 32 in the bay 30. The cover 90 may take any suitable form and be constructed of any suitable environmentally resistant materials, such as metal, plastic, fabric, or any combinations thereof.

By example, the cover 90 is illustrated as having a top slightly arched sheet 92 with side curtains 94 and 96 extending therefrom. The side curtains 94 and 96 are spaced from the parallel vertical walls 24 and 26 by vertically-extending supports 98. The top slightly arched sheet 92 is spaced above the top edges of the parallel vertical walls 24 and 26. The arch to support the top slightly arched sheet 92 may be formed integrally with at least some of the vertically-extending supports 98, or may comprise separate structures secured to the vertically-extending supports 98. The vertically-extending supports 98 may be of any suitable material, such as metal, plastic, or wood, and may be supported by the hard surface 28, such as being driven into the hard surface 28 or removably affixed to the hard surface 28.

The side curtains 94 and 96 can have a length so as to extend to ground level. The side curtains 94 and 96 can be rolled up as shown by reference numbers 95 and 97, respectively, for increased airflow or lowered to the ground level to reduce the ingress of moisture from rain, snow, fog, etc., into the enclosure 22. An end curtain may also have a length to reach ground level and be capable of being rolled up into a roll 93 and secured by straps in the rolled up position to allow air flow or to reduce the ingress or moisture into the waste material 32 in the enclosure 22.

Alternatively, a flexible tarp may be used as a cover and manually applied over the top of the parallel vertical walls 24 and 26 of the enclosure 22. The enclosure 22 may also be mounted in a closed structure where the top, sides, and ends of the enclosure 22 are sealed off from the ambient atmosphere. Such an enclosure may also be sealed from entry of ambient air.

Figure 6:
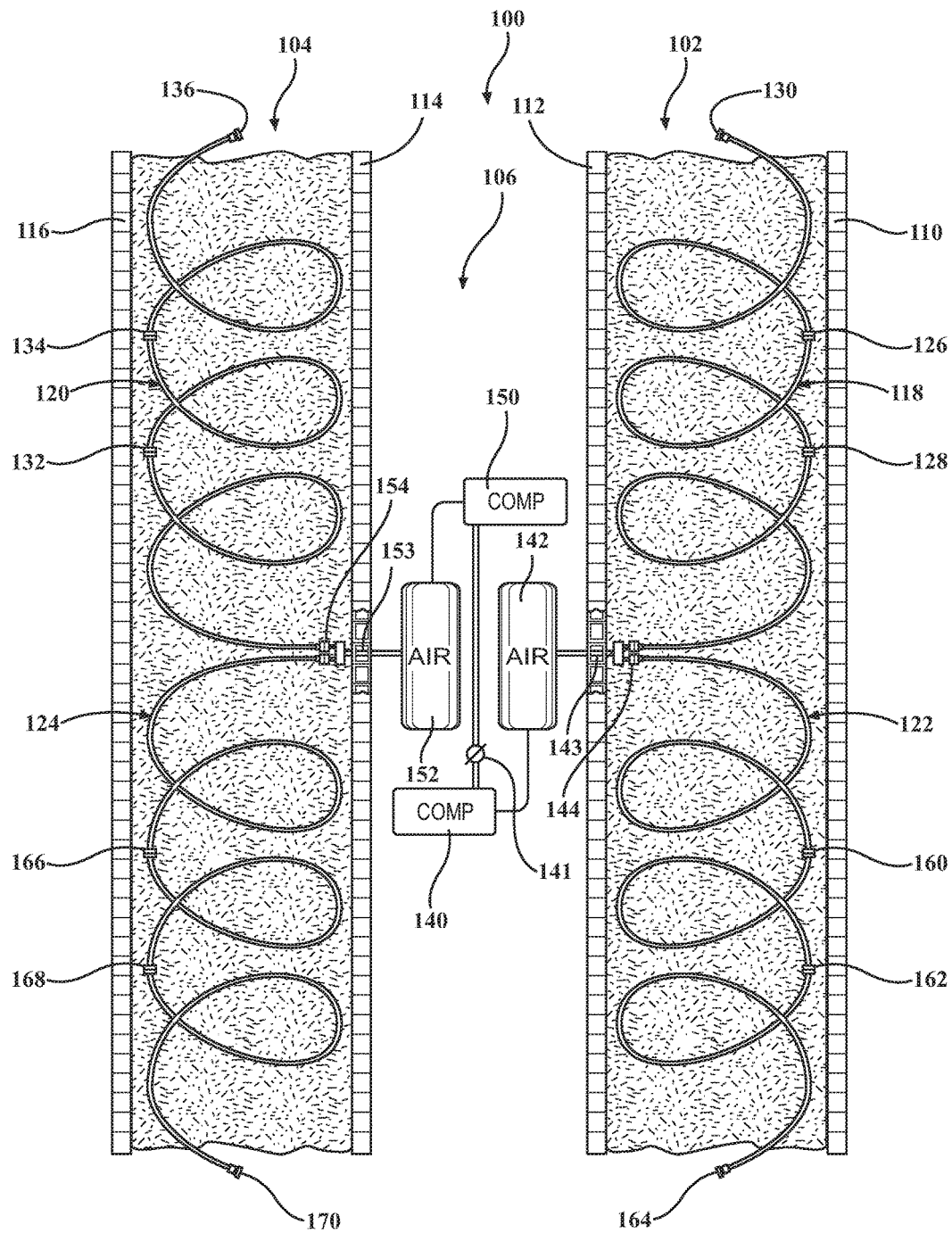
FIG. 6 is a partial, schematic top view of a second implementation of an apparatus for decomposing waste material.
Figure 7:
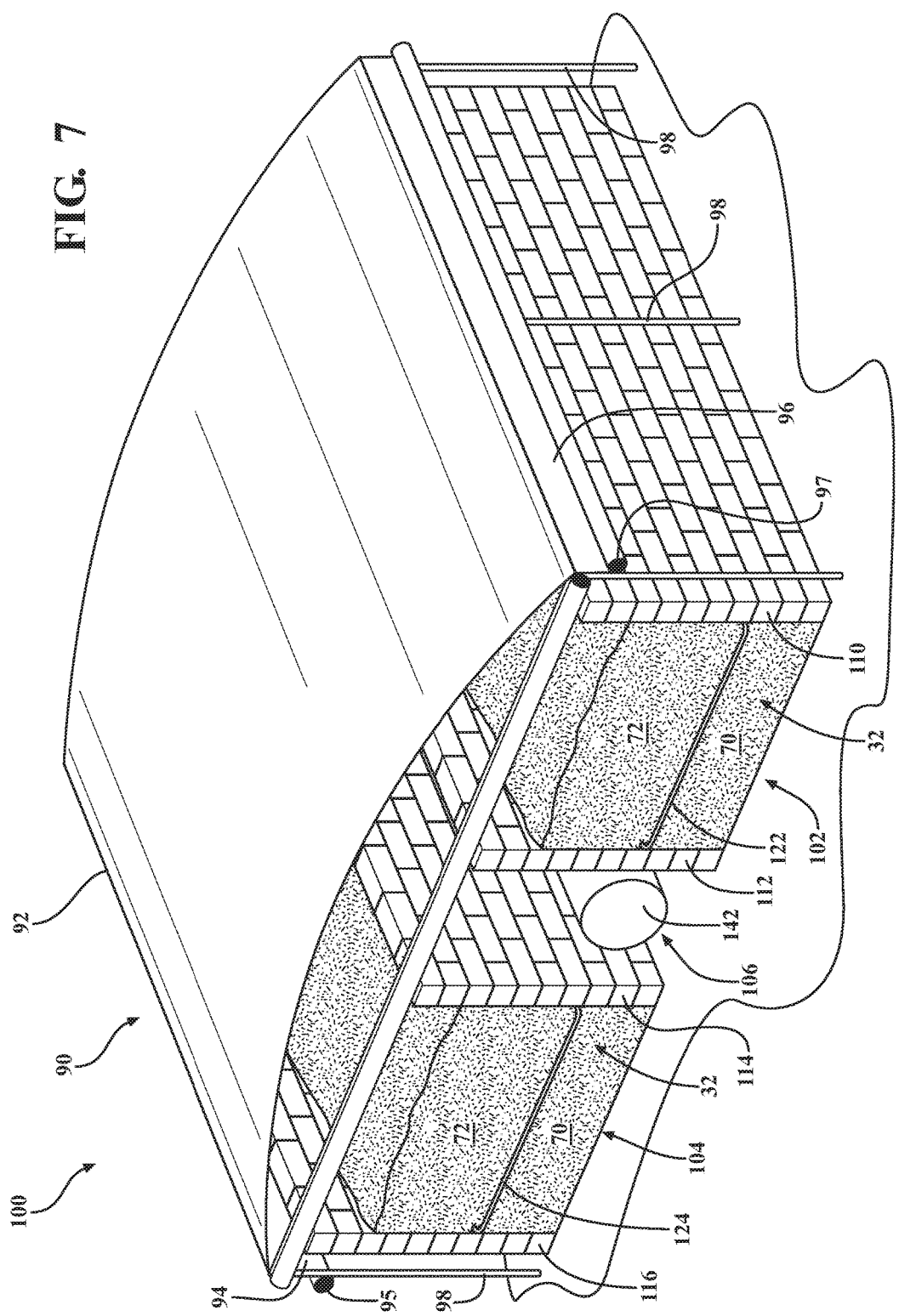
FIG. 7 is a perspective view of a modification of the second implementation of FIG. 6.

Referring now to FIGS. 6 and 7, there is depicted another implementation of a composting apparatus 100. In this implementation, the composting apparatus 100 includes a plurality of spaced bays, with three bays 102, 104, and 106 shown by way of example. The bays 102 and 104 may be constructed similarly to the bay 30 described above and shown in FIGS. 1-5.

For example, the bay 102 is formed with a pair of generally parallel, longitudinally extending walls 110 and 112. The walls 110 and 112 may be any length, such as the fifty-foot length described above as an example for the bay 30 or a longer length, such as an approximate 100-foot length, as shown by example in FIG. 6.

The bay 104 is similarly formed of first and second longitudinally extending generally parallel walls 114 and 116. The bay 104 may have the same or a different length from the bay 102, although the bay 104 is illustrated by example in FIG. 6 as having the same construction and length as the bay 102.

At least one fluid injection member, such as a first hose 118, is disposed in the above-described spiral wrap over a lower, first layer of waste material 32. A first fluid injection member or first hose 120 is similarly disposed in a spiral wrap pattern over a lower, first layer of waste material 32 in the bay 104. Each of the first hose 118 and the first hose 120 extends from an inlet end disposed intermediate the end of the bay 102 or the bay 104, respectively, to an end capped by a respective plug 130 and 136.

The inlet ends of the first hose 118 and the first hose 120 are coupled to connectors 144 and 154, respectively. The connectors 144 and 154 are coupled to a source of compressed air, such as separate compressors 140 and 150 located in the bay 106. It will be understood that a single, large-capacity compressor may be used to supply air to both of the first hose 118 in the bay 102 and the first hose 120 in the bay 104. In the case of separate compressors 140 and 150, the compressors 140 and 150 may be interconnected by a fluid conduit having a shut off valve 141 interposed therein. The shut off valve 141 allows the compressors 140 and 150 to operate independently to supply air to the respective air tanks 142 and 152. At the same time, in the event of a breakdown of one of the compressors 140 and 150, the shut off valve 141 allows the remaining operative compressor 140 or 150 to supply pressurized air to both of the air tanks 142 and 152.

Each compressor 140 and 150 is coupled to a separate air reservoir, such as the air tanks 142 and 152, respectively, located in the bay 106. For simplicity, a single air tank 142 or 152 is illustrated by example as being coupled to each compressor 140 and 150. A plurality of separate air tanks, such as the air tanks 42, 44, 46, and 48 coupled to the compressor 40 in FIG. 2 may also be employed in the composting apparatus 100.

The installation of the first hose 118 and the first hose 120, the deposit of waste material 32 into the bay 102 and the bay 104, and the supply of air from the air tank 142 and the air tank 152 to the first hose 118 and the first hose 120 for composting the waste material 32 may be the same as that described above for the composting apparatus 20.

As further shown in FIG. 6, an additional hose is disposed in each of the bays 102 and 104. Namely, a second hose 122 is disposed in the bay 102, and a second hose 124 is disposed in the bay 104. The second hose 122 and the second hose 124 are separate from the first hose 118 and the first hose 120 and can be operated simultaneously with or independently of the first hose 118 and the first hose 120.

The second hose 122 has an inlet end located at an intermediate portion of the bay 102 adjacent to the inlet end of the first hose 118 in the bay 102, and is coupled by the connector 144 to the compressor 140. An outlet end is sealed by a plug 164. Similarly, the second hose 124 has an inlet end coupled by the connector 154 to the compressor 150 at an intermediate portion of the bay 104. An outlet end of the second hose 124 is sealed by a plug 170.

Each of pair of hoses formed by the first hose 118 and the second hose 122 and by the first hose 120 and the second hose 124 may be formed of hose segments coupled together by connectors, such as connectors 126 and 128 for the first hose 118 in the bay 102, connectors 132 and 134 for the first hose 120 in the bay 104, connectors 160 and 162 for the second hose 122 in the bay 102, and connectors 166 and 168 for the second hose 124 in the bay 104.

Each pair of hoses may have the sequential reduction in diameter from the respective inlet end similar to that discussed with regard to the first hose 60 and the second hose 80 so as to maintain a constant air pressure and air discharge quantity along the length of each of the first hose 118, the first hose 120, the second hose 122, and the second hose 124.

The tee or manifold connection between the outlet of the air tanks 142 and 152 to the respective pairs of hoses may be provided exteriorly of the parallel walls 112 and 114 of the bays 102 and 104, respectively, such as by attaching a flexible or rigid air conduit between an outlet of the air tank 142 or 152 vertically along the exterior of the parallel wall 112 or 114 to the top edge of the parallel wall 112 or 114. Each of the two tee or manifold connections may be located on the top edge of a respective parallel wall 112 and 114.

Alternately, as shown in FIG. 6, the outlets of the air tanks 142 and 152 may extend underground to a respective air conduit 143 or 153 extending through the hollow interior of a parallel wall 112 or 114, such as through an opening in the interior of cinder blocks used to form the parallel walls 112 and 114. In this installation example, the tee or manifold connectors 144 and 154 are mounted adjacent to or on the top edge of the parallel walls 112 and 114 for easy connection to the pair of hoses in the bays 102 and 104. An overhead air hose may extend from a 1 inch line hanging from the ceiling downward to a quick-connect, and one or more feeder hoses may extend through or along the walls 112, 114.

As shown in FIG. 7, the composting apparatus 100 may also be provided with the cover 90, although formed of a larger size than the cover 90 for the bay 30 shown in FIG. 5, which is a single bay or a shorter length. The same reference numbers are used to depict the same components in each of the covers 90. The cover 90 for the composting apparatus 100 provides protection to reduce the amount of rain, snow, and other moisture from entering the waste material 32 in the bays 102 and 104, while allowing the ends of the bays 102 and 104 to remain open for air circulation.

Figure 8:
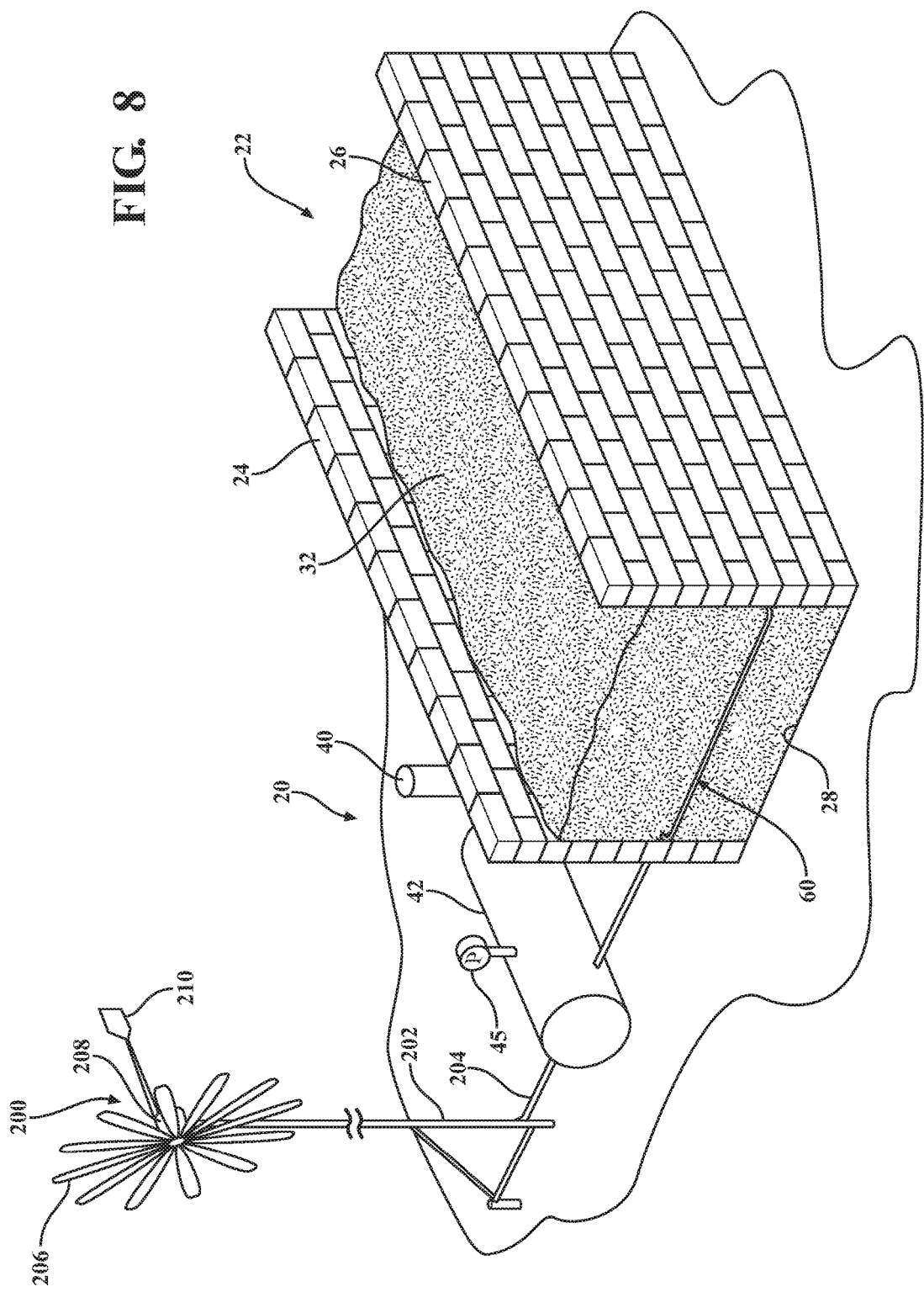
FIG. 8 is a perspective view of a modification of the first implementation of FIG. 1 with a powered compressor that can also be used with the second implementation of FIG. 6.

Referring to FIG. 8, there is depicted a modification to the composting apparatus in which the electric-power or gas-powered compressors are supplemented by a wind compressor energy system 200, such a wind compressor energy system sold by Wind Compressor, LLC.

The wind compressor energy system 200 includes a tower or pole 202 mounted in the ground and supporting a fluid conduit or air line 204. A three-blade, eleven-foot rotor 206 is moveably attached to the upper end of the pole 202 along with a single stage compressor 208. A directional control fin 210 is coupled to the base to maintain the blades of the rotor 206 facing the direction of the wind.

The wind compressor energy system 200 includes an air pressure switch responsive to a pressure gauge 45 that furls the blades of the rotor 206 when a desired air pressure is reached in an air tank 42 to prevent over-pressure conditions. Pressure relief valves, mounted on the base, can be preset for 160 or 170 psi in some aspects. Although not shown in detail, a shock absorber can be mounted on the base to prevent over speed conditions and high winds by allowing the blades of the rotor 206 to furl.

In operation, when the wind is blowing, the blades of the rotor 206 provide energy to the single stage compressor 208, which provides pressurized air through the air line 204 to the fluid reservoir or air tank 42, etc.

The use of the wind compressor energy system 200 allows for operation of the composting apparatus 20 or 100 at significantly reduced energy usage levels over operation by compressor 40 or compressors 140, 150 without the use of the wind compressor energy system 200.

Figure 9:
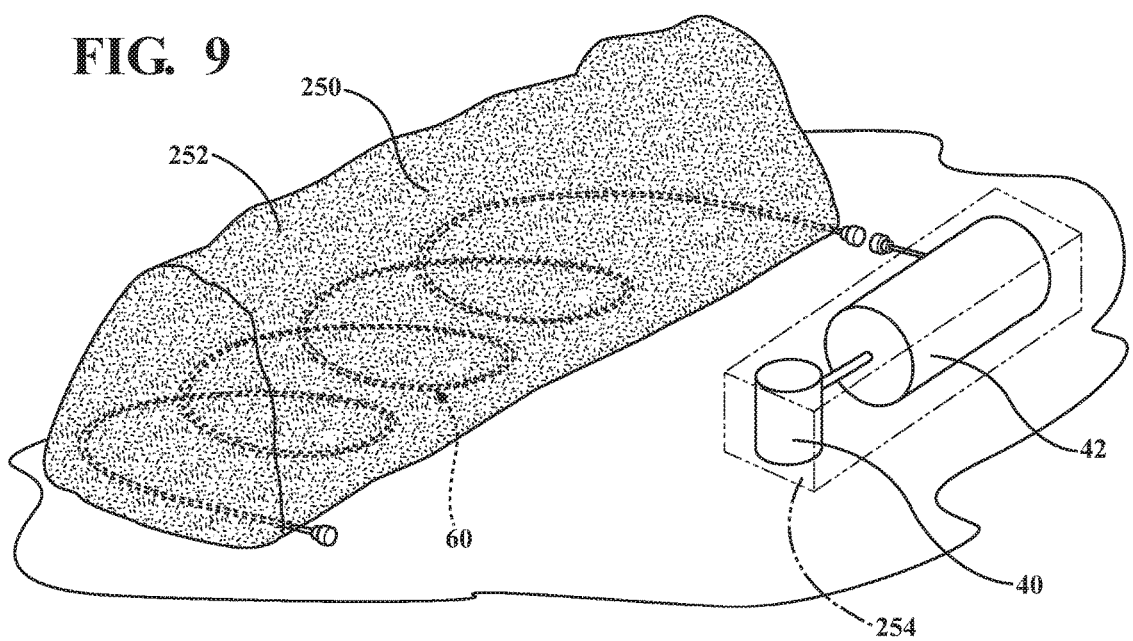
FIG. 9 is a diagram of an open-field configuration of a windrow process usable with an implementation of an apparatus for decomposing waste material described in this disclosure.

A spiral wrap fluid injection member, such as the first hose 60 supplied with pressurized air from an air tank 42 connected to a compressor 40, may also be used in open field composting operations, such as an open field windrow process 250 shown in FIG. 9. In a windrow process 250, waste material 252 is deposited in a pile that may extend to a height of approximately 5 feet over a width of about 12-15 feet and any length, such as about 100 feet in an example. The first hose 60 is introduced in a spiral wrap into the windrow pile of waste material 252 at the above-described six inch to one-foot height above ground level to supply pressurized air on a substantially continuous basis to the waste material 252. A second spiral wrap hose 80 (not shown in FIG. 9), may also be used in the pile of waste material 252 as described above.

As also shown in FIG. 9, due to the open field configuration of the windrow process 250, the compressor 40 and air tank 42 can be mounted within an enclosure 254.

Figure 10:
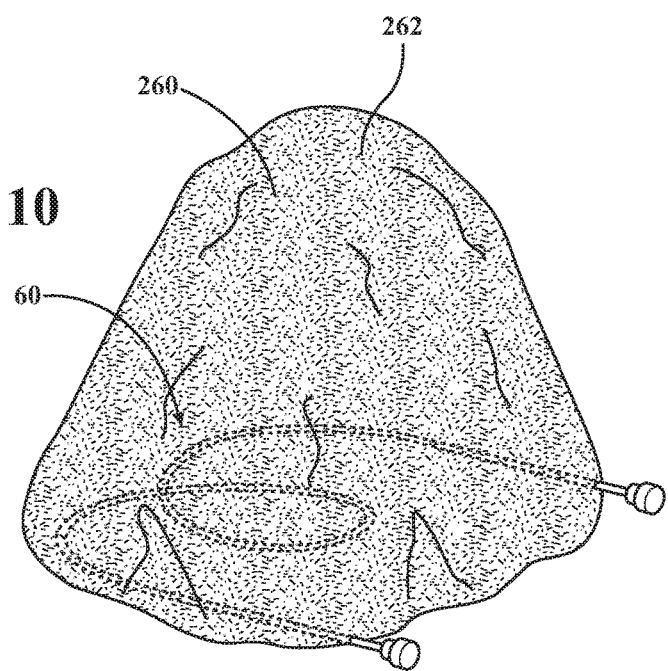
FIG. 10 is a diagram of an open-field configuration of a static pile usable with implementation of an apparatus for decomposing waste material described in this disclosure.
Figure 11:
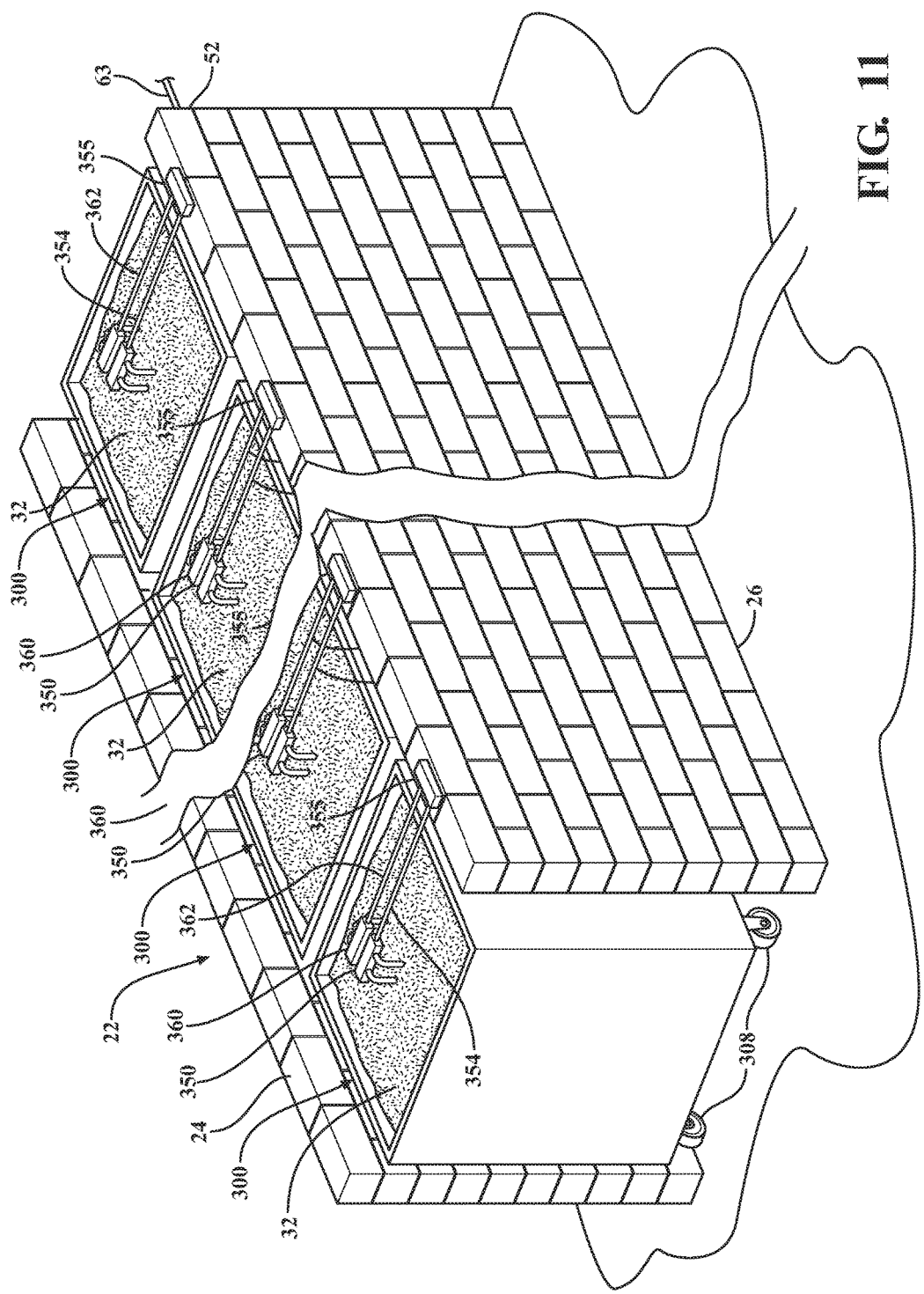
FIG. 11 is a perspective view of a third implementation of an apparatus for decomposing waste material.

The spiral wrap configuration of the first hose 60 may also be applied to a static pile 260 for composting waste material 262 as shown in FIG. 10. The static pile 260 is a domed-shaped accumulation of composting waste material 262 in which the first hose 60 is introduced in a spiral wrap at the appropriate height above ground level, and is connected to a suitable air tank 42 and compressor 40 (not shown in FIG. 10). A second hose 80 may also be introduced in the static pile 260.

FIGS. 11-15 depict another composting apparatus that, like the composting apparatus 20, uses the open air enclosure 22 formed of the two spaced, generally parallel vertical walls 24 and 26. In this implementation, at least one or a plurality of movable storage containers 300 are movably deployed within the enclosure 22. Each storage container 300 has a size and shape to contain a volume of waste material 32 in addition to a fluid distribution system coupled to one or more compressors and air tanks, as described in previous implementations of the composting apparatus, and to a fluid injection system deployed in each storage container 300. The storage containers 300 are constructed in polygonal square or rectangular shapes, by example, with a plurality of inner interconnected side walls 302, a bottom wall 304, and an open top end 306 (see FIG. 15). Wheels 308 may be mounted to the bottom wall 304 to facilitate movement of the storage container 300 through the enclosure 22.

A fluid injection system, also referred to as a rack 320, is sized to fit within the interior of each storage container 300.

Figure 12:
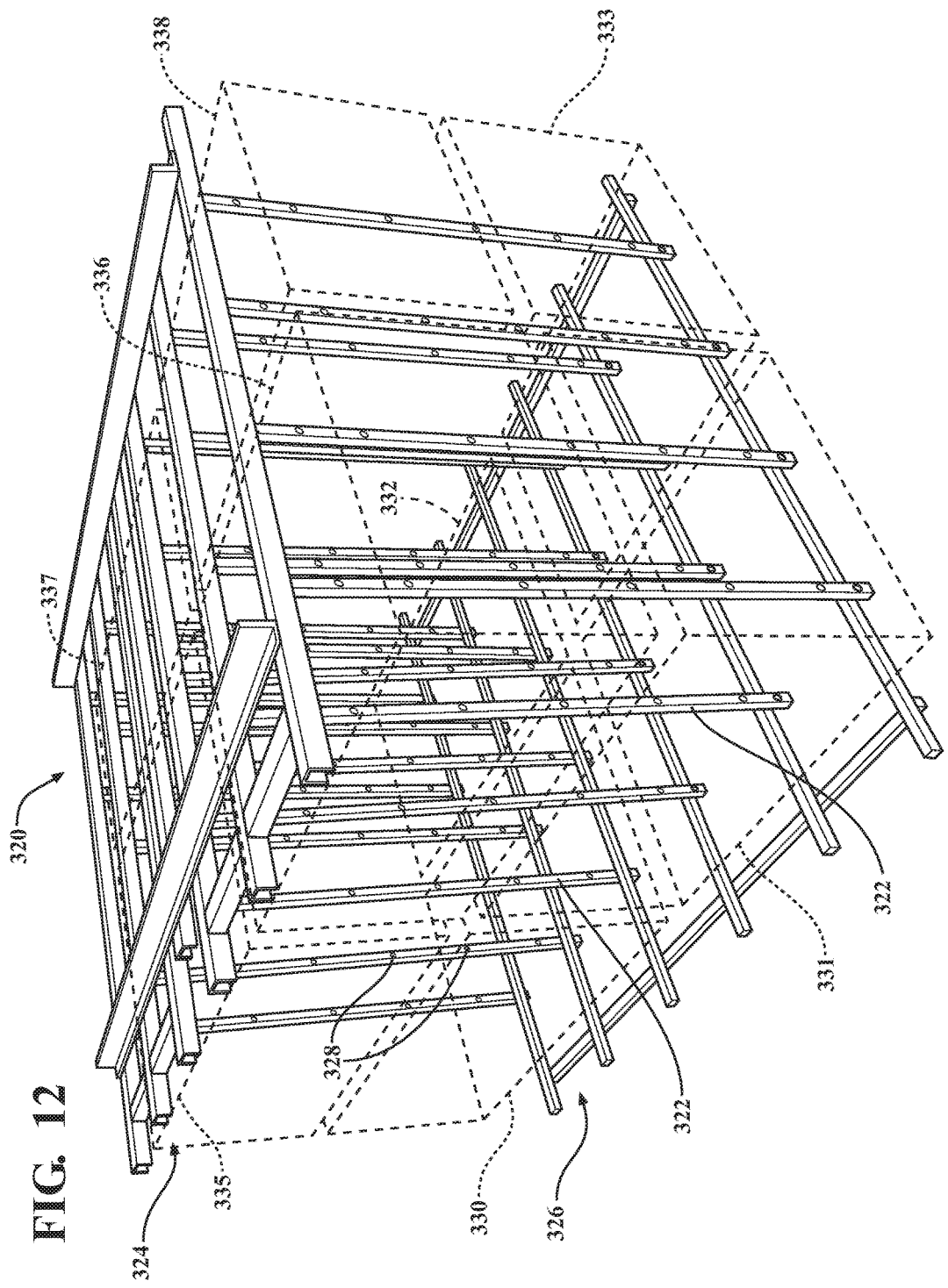
FIG. 12 is a perspective view of an enclosure rack of the third implementation of FIG. 11.
Figure 13:
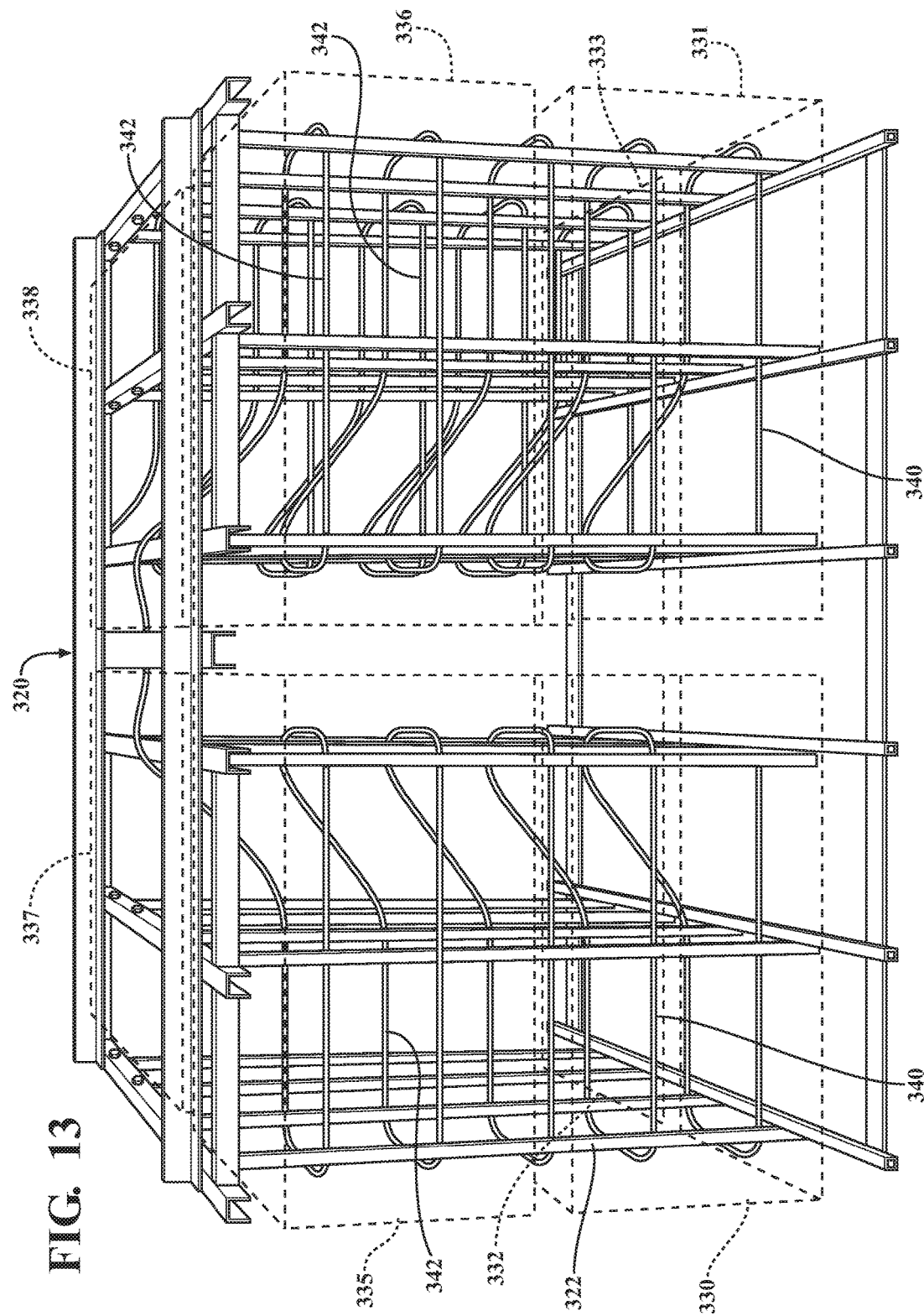
FIG. 13 is a perspective view of the enclosure rack of FIG. 12, including hoses.
Figure 15:
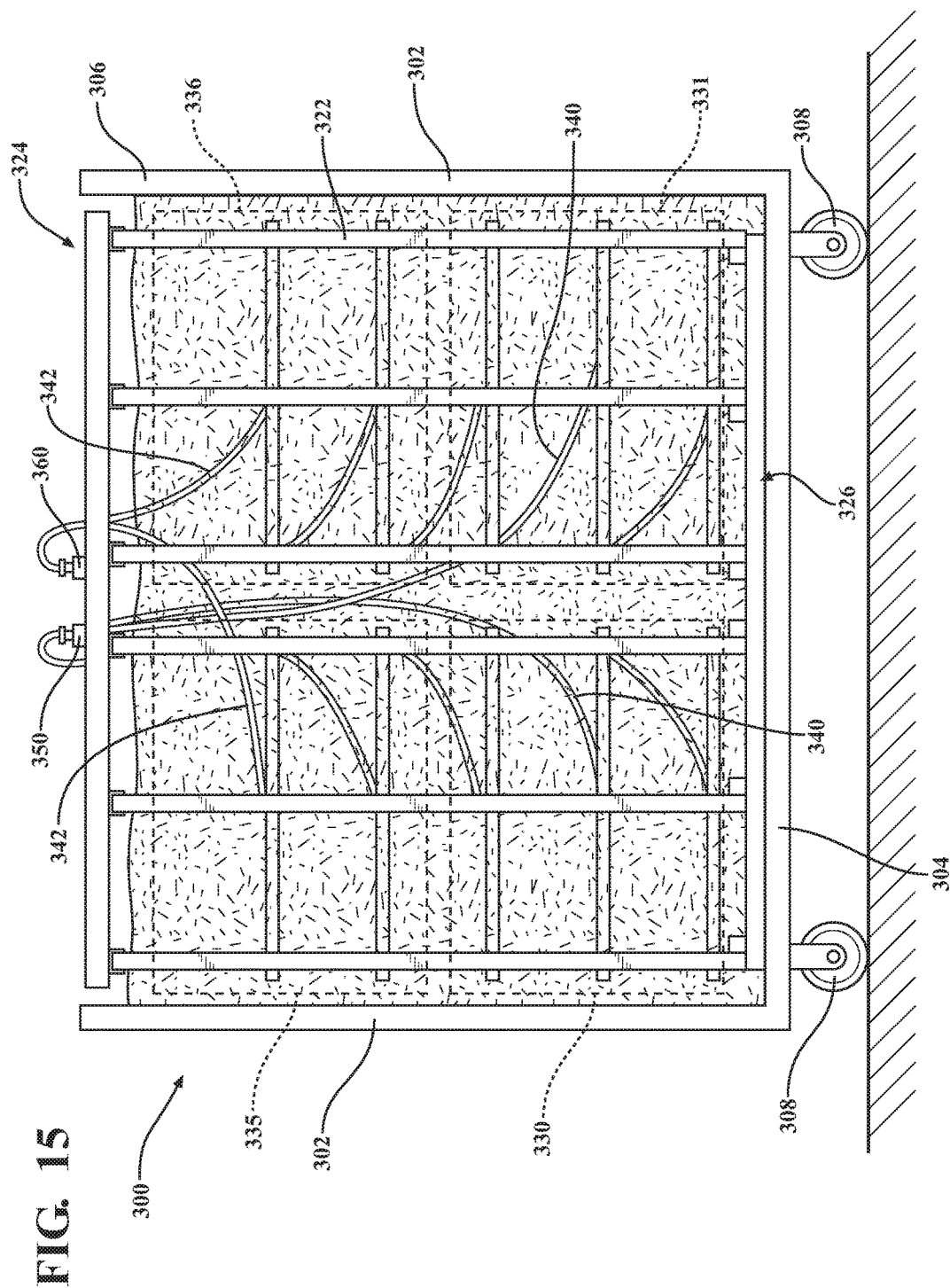
FIG. 15 is a side view of the interior of movable storage container of the third implementation of FIG. 11.

As shown in FIGS. 12, 13, and 15, each rack 320 is formed of a plurality of vertically-spaced tubular members 322, which are connected at opposite ends to upper and lower frame assemblies 324 and 326, also formed of interconnected tubular and/or strip members.

The vertically-spaced tubular members 322 include a plurality of horizontally-spaced apertures 328, the purpose of which will be described hereafter.

Each rack 320 is divided, by example, into lower and upper portions, each portion including a plurality of horizontally-arranged sections. The lower portion includes four lower sections 330, 331, 332, and 334, for example. The upper portion includes a similar number of upper sections 335, 336, 337, and 338. Each upper section 335, 336, 337, and 338 is disposed above a respective lower section 330, 331, 332, and 333.

Figure 14:
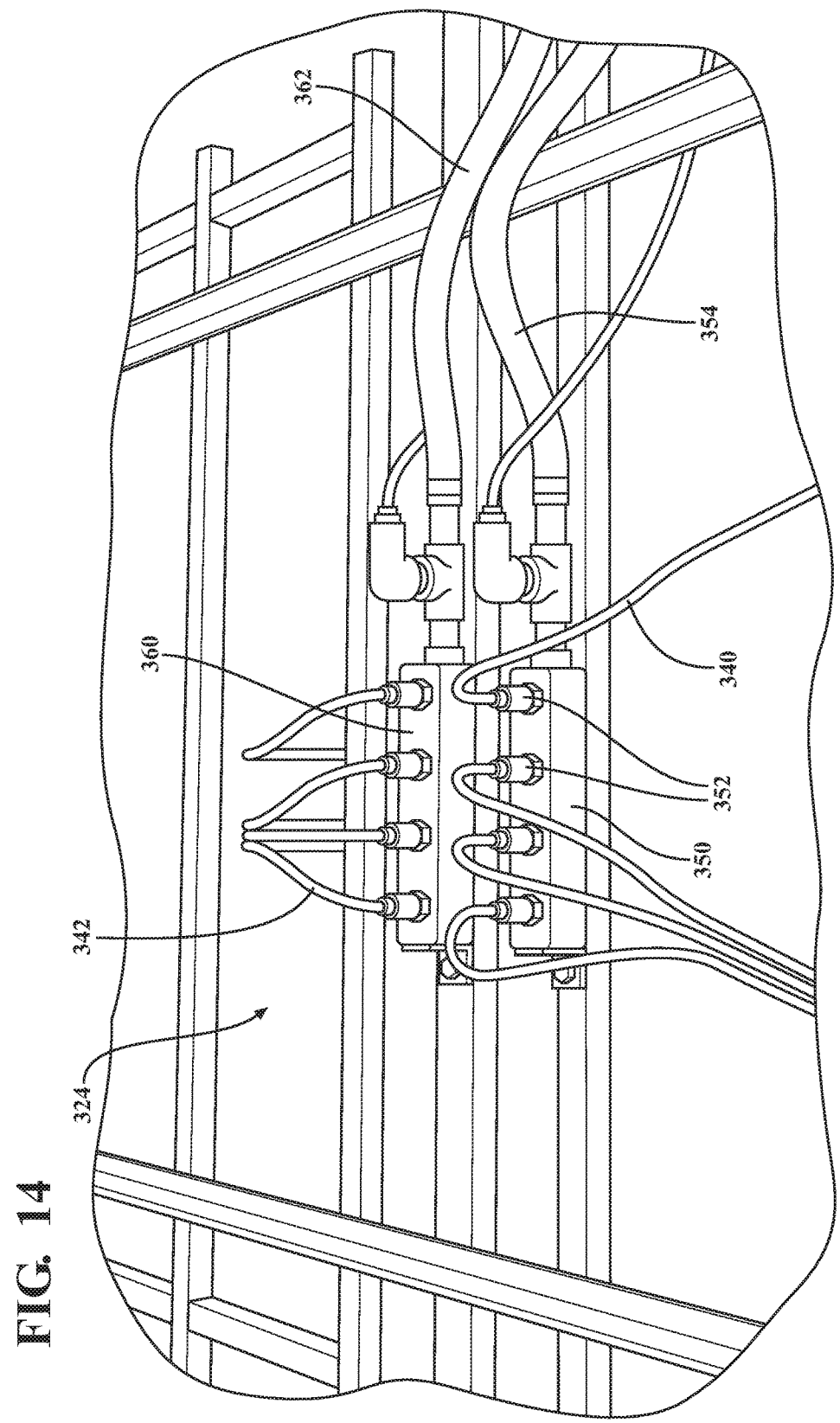
FIG. 14 is a partial perspective view of the top of the enclosure rack of FIG. 12.

Each lower and upper section includes a flexible air fluid injection member. For example, hoses 340 are in each lower section, with four hoses 340 being shown by way of example in the four lower sections. Four similar flexible air fluid injection members, namely hoses 342, are disposed in the upper sections 335, 336, 337, and 338 respectively. Referring to FIG. 14, each of the hoses 340 in the lower sections is coupled to a first manifold 350 (see also FIGS. 11 and 15) that is mounted on the upper frame assembly 324 of the rack 320 via individual hose connections 352. A fluid inlet conduit, referred to as hereinafter as a fluid inlet hose 354, is coupled to the first manifold 350.

The fluid inlet hose 354 may be flexible and mounted in a particular location along the length of the enclosure 22 in proximity with a position that a storage container 300 may be located in the enclosure 22 during a composting cycle. With eight storage containers 300 being able to be disposed within a fifty-foot long enclosure 22, for example, eight fluid inlet hoses 354 are provided at spaced locations along the length of the parallel vertical walls 24 and 26. Each of the fluid inlet hoses 354 may be coupled to a tee connector 355 and a fluid conduit mounted on or near the parallel vertical walls 24 and 26 and coupled to an air inlet supply line 63 and connector 52 from the compressor and air tanks, as described in previous implementations of the composting apparatus 20.

A second manifold 360 is also mounted on the upper frame assembly 324 of each rack 320 and coupled to the plurality of flexible air fluid injection members, such as the hoses 342 in the upper sections in the rack 320. One or more air inlet hoses or conduits 362 are coupled to the second manifold 360, respectively, and interconnected via the tee connectors 355 to the air supply compressor/air tank.

Long length bays can be constructed with lengths of 200 or 300 feet for more to accommodate additional storage containers 300.

The separation of the hoses 340 and 342 in the lower and upper sections to separate first and second manifolds 350 and 360 provides energy savings. That is, in the case of less than a volume of waste material 32 filling the entire storage container 300, for example if one storage container 300 is only half full of waste material 32 disposed in the lower portion of the storage container 300, only the hoses 340 in the lower sections may be supplied with air. This eliminates the unnecessary supply of pressurized air to the hoses 342 in the upper sections of any rack 320 when the upper sections are devoid of waste material 32.

One or more of the total number of storage containers 300 in the enclosure 22 at one time may have less than a full volume of waste material 32. It is also possible that less than the maximum number of storage containers 300, eight in the present example, may be disposed in the enclosure 22 at the same time for a single composting cycle. In each situation, at least some of the fluid inlet hoses 354 and 362 to the first and second manifolds 350 and 360 may be plugged or otherwise closed off and other fluid inlet hoses 354 and 362 coupled to other storage containers 300 containing a full complement of waste material 32 may be opened.

As shown in FIGS. 13 and 15, the hoses 340 and 342 in each section of each rack 320 are arranged in a spiral wrap configuration by inserting the hoses 340 and 342 through the apertures 328 in the vertically-spaced tubular members 322 in each rack 320 and looping them in a spiral like configuration from one end connected to the respective first and second manifolds 350 and 360 through and along one horizontal aligned row of vertically-spaced tubular members 322, and over to and back through a parallel row of vertically-spaced tubular members 322. Each hose 340 or 342 may continue in the back and forth spiral pattern one or two additional times until the end portion of the hose 340 or 342 passes through a last vertically-spaced tubular member 322 and receives a plug or other closure device (or is connected to another air inlet as described with regard to the first hose 60 of the first implementation).

To equalize air pressure in each of the hoses 340 in the lower sections 330, 331, 332, and 334, the lengths of inlet ends of the hoses 340 are substantially the same length from the end connection to the first manifold 350 to the entry point into each lower section. The same equal length inlet end also applies to the hoses 342 in the upper sections 335, 336, 337, and 338.

Figure 16:
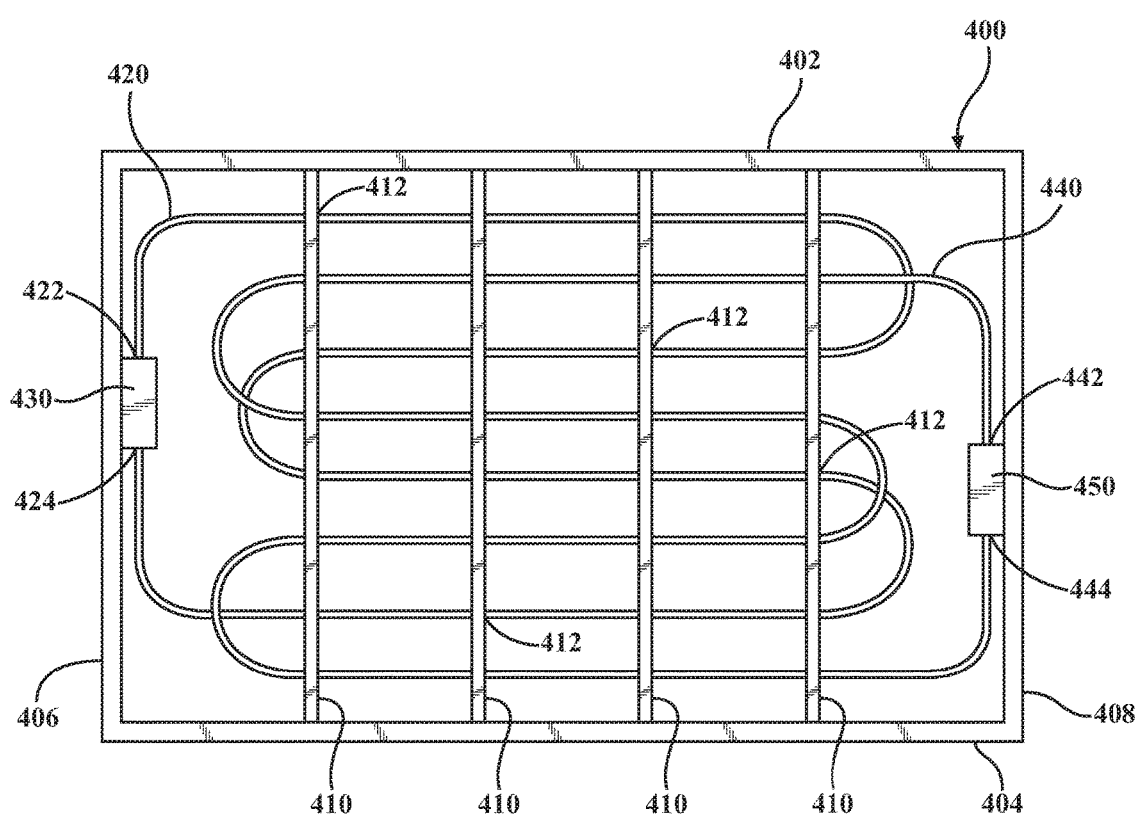
FIG. 16 is a partial top view of the interior of a storage container of fourth implementation of an apparatus for decomposing waste material.

The apparatus of FIG. 16 is referred to as a partial top view because the waste material 32 is omitted for clarity. A storage container 400 may be movably deployed within the enclosure 22 similarly to the movable storage containers 300. In this example, the storage container 400 is 10 feet in length and about 4 feet in height, but its dimensions can vary. Opposing ends of a first set generally L- or T-shaped cross-pieces 410, like those that form the upper frame assembly 324, are affixed (e.g., by spot welding) to opposite walls 402, 404 of the storage container 400. The set of cross-pieces 410, four in this example, are affixed to a bottom edge of the storage container 400 in an inverted position such that the stem of the L- or T-shape extends upward and is later covered by the waste material 32.

The stem of the L- or T-shape has a plurality of hose supporting holes 412 extending therethrough. A hose 420 with a substantially constant diameter in this example has its first end 422 coupled to a manifold 430 receiving air from an air source (not shown in FIG. 16), and is arranged in a serpentine pattern by inserting the hose 420 through the hose supporting holes 412 until the opposing, second end 424 returns to and is connected to the manifold 430. In this way, the hose 420 as shown extends in parallel with the bottom of the storage container 400 and ground. Here, the serpentine pattern results in a U-shape, but this is not necessary. Moreover, the hose 420 may instead be in a spiral wrap configuration as previously described. The manifold is supported on an end 406 of the storage container 400. Connections to the first end 422 and the second end 424 of the hose 420 to the manifold 430 are not shown in FIG. 16, but they may be similar to the two-part connectors 50 or connections described with respect to the first and second manifolds 350, 360 above. The hose 420 has a plurality of spaced holes for outlet of the air as described previously.

If the height of the storage container 400, and hence the waste material 32, does not exceed a certain height above ground (or in this case the bottom of the storage container 400), there may be no need for additional sources of air to perform the decomposing. However, if needed or desirable, the storage container 400 may include another set of generally L- or T-shaped cross-pieces affixed at height of, for example, 4 feet. This second set of generally L- or T-shaped cross-pieces is either aligned with the set of cross-pieces 410 or offset from the set of cross-pieces 410 in the horizontal direction between the ends 406. They are omitted from FIG. 16 for clarity, but they may be identical in structure to the cross-pieces 410 and may be affixed with their stem, and hence their hose supporting holes 412, either facing toward or away from the first set of cross-pieces 410. In either event, the hose supporting holes 412 of the second set of cross-pieces are offset from the hose supporting holes 412 of the first set of cross-pieces 410 so that a second hose 440, also having a plurality of air outlet holes like the hose 420, is arranged in a similar pattern to the hose 420, but is offset in the horizontal direction between the walls 402, 404 of the storage container 400 as shown in FIG. 16. Alternatively, but less desirably, the holes 412 and hoses 420, 440 may be substantially or completely aligned. In still another variation, the hoses 420, 440 may be arranged in different shapes, such as one in a serpentine shape and one in a spiral wrap configuration, each arranged substantially within a horizontal plane parallel to the ground.

A first end 442 of the hose 440 and a second end 444 of the hose 440 are pneumatically coupled to a second manifold 450 in a like manner as the ends 442, 424 of the hose 420 are coupled to the manifold 430. The second manifold 450 is supported manifold is supported on the end 408 of the storage container 400, but it could alternatively be support of the end 406 of the storage container 400. The manifolds 430, 450 are not shown in detail in FIG. 16, but any of the air sources of FIG. 2, 4, 6, 8, 10, or 14 may be used.

The above-described aspects of the composting apparatus provide an inexpensive and economical alternative to other techniques for composting, at least in part because it is a no-turn composting apparatus that implements a no-turn composting method. That is, the waste material 32 is decomposed into compost without requiring turning of the waste material. At the same time, the composting operation is odorless since air is continually pumped into the waste material, preventing an anaerobic condition or a lack of oxygen state to occur within the waste material that leads to the generation of methane gas and thereby odor from the composting apparatus.

After the waste material 32 has been in the enclosure 22 and supplied with oxygen for defined amount of time, the air pressure within a first hose, such as the first hose 60, is lowered to a minimal pressure level, such as 5 psi for subsequent period of time, such as two to three weeks. Alternatively, the waste material 32, which is in an uncured compost state, can be removed from the enclosure 22 and placed in a pile outside of the enclosure 22 for a longer period of time, such as 90 days or more. The waste material 32 in its uncured, composted state can also be left in the enclosure 22 for two to three weeks to complete curing.

At the end of the cure period, the waste material 32 has been reduced to compost or humus, which can be used as fertilizer.

While the invention has been described in connection with certain implementations or embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An aerobic composting apparatus for composting waste material, comprising:
   an enclosure for containing waste material; and
   a fluid distribution system including an air hose removably disposed within waste material disposed in the enclosure, the air hose including spaced apertures for injecting air into the waste material, wherein the air hose is flexible and comprises a pliable material that contracts when depressurized such that the spaced apertures close to prevent plugging with waste material, and expands when pressurized such that the spaced apertures open to a throughbore extending through the air hose, wherein:
   the air hose disposed in the enclosure in longitudinally extending spiral loops extending between walls of the enclosure; and
   adjacent portions of the longitudinally extending spiral loops of the fluid injection member disposed in a laterally-spaced-apart arrangement along the enclosure.

2. The aerobic composting apparatus of claim 1, further comprising:
   the air hose disposed above a first layer of waste material deposited in the enclosure and covered by a second layer of waste material deposited in the enclosure.

3. The aerobic composting apparatus of claim 1, further comprising:
   the air hose disposed at a bottom of the enclosure and covered by a layer of waste material deposited in the enclosure.

4. The aerobic composting apparatus of claim 3, wherein the air hose is disposed from end to end in the enclosure in a serpentine pattern extending between opposed walls of the enclosure and is lying substantially within a horizontal plane relative to a ground surface.

5. The aerobic composting apparatus of claim 1, wherein the air hose is formed of a plurality of fluidically-coupled segments, the plurality of fluidically-coupled segments decreasing in diameter from an inlet end of the fluid injection member.

6. The aerobic composting apparatus of claim 1, further comprising:
   a fluid reservoir that supplies pressurized air to the air hose; and
   a compressor that supplies pressurized fluid to the fluid reservoir.

7. The aerobic composting apparatus of claim 6, wherein the compressor comprises a wind powered compressor.

8. The aerobic composting apparatus of claim 1, further comprising:
   a cover over a top of the enclosure; and
   the cover leaving ends of the enclosure open.

9. The aerobic composting apparatus of claim 1, further comprising:
   a plurality of enclosures that receive waste material; and
   the air hose disposed in each of the plurality of enclosures.

10. The aerobic composting apparatus of claim 9, further comprising:
    the air hose in at least one enclosure including at least two flexible air hoses.

11. The aerobic composting apparatus of claim 1, further comprising:
    a set of support members extending between opposed walls of the enclosure and spaced apart between ends of the enclosure, each support member located at a bottom of the enclosure and having a vertically extending portion with apertures through which the air hose is threaded.

12. The aerobic composting apparatus of claim 1, wherein the air hose comprises:
    a first air hose and a second air hose disposed in the enclosure above the first air hose;
    the second air hose disposed on top of a second layer of waste material disposed over the first air hose; and
    a third layer of waste material disposed on top of the second air hose.

13. A method of composting waste material, comprising:
    positioning waste material in an enclosure formed of longitudinally extending spaced walls; and
    introducing a fluid injection member between ends of the spaced walls of the enclosure within the waste material so that the fluid injection member extends in a substantially horizontal plane and is covered by a layer of waste material in the enclosure, including:
       disposing the fluid injection member in the enclosure in longitudinally extending spiral loops extending between walls of the enclosure; and
       disposing adjacent portions of the longitudinally extending spiral loops of the fluid injection member in a laterally-spaced-apart arrangement along the enclosure.

14. The method of claim 13, further comprising:
    disposing a second fluid injection member in the enclosure in a serpentine pattern, ends of the second fluid injection member coupled to a common source of air.

15. An aerobic composting apparatus for composting waste material arranged in a vertically and horizontally extending mass, the aerobic composting apparatus comprising:
    a fluid distribution system including an air hose removably disposable within the waste material, the air hose including a number of spaced apertures for injecting pressurized air from a source of pressurized air into the waste material;
    the air hose disposed within the vertically and horizontally extending mass of waste material in spiral loops within a horizontal plane relative to a ground surface, adjacent portions of the spiral loops being laterally spaced apart; and
    the air hose comprises a pliable material that contracts when depressurized such that the spaced apertures close to prevent plugging with waste material, and expands when pressurized by the source of pressurized air such that the spaced apertures open to a throughbore extending through the air hose.

16. The aerobic composting apparatus of claim 15, further comprising at least one of:
    the vertically and horizontally extending mass of waste material in a longitudinally extending windrow; or
    vertically and horizontally extending mass of waste material in a static pile of waste material.

* * * * *